United States Patent Office 3,048,511
Patented Aug. 7, 1962

3,048,511
POLYVINYL ALCOHOL COMPLEX FILM
Jay F. Strawinski, 1814 Dunwoody Circle,
Baltimore 34, Md.
No Drawing. Filed Jan. 5, 1959, Ser. No. 784,862
16 Claims. (Cl. 154—50)

This invention relates to polyvinyl alcohol complex film.

In the prior work with polyvinyl alcohol in the form of film, filamentary or molded products, previously cast from any of the available types of polyvinyl alcohol, including hydrolized, partially hydrolized and the like, many different chemical agents have been employed. The prior treatments were intended to improve the products to the point of commercial usefulness and marketability and to overcome an inherent weakness of polyvinyl alcohol, that is, of water sensitivity.

Much of the work heretofore carried out with respect to polyvinyl alcohol has been to improve the water resistance of the polyvinyl alcohol film, filamentary or molded products, so that deterioration would not readily take place in the presence of water. Many different acidic agents, including hydrochloric acid, sulphuric acid, chromic acid, boric acid and tannic acid, and many different basic agents, including sodium hydroxide, potassium hydroxide, aluminum hydroxide and sodium borate, have been employed for this purpose. While many of the reactions did in effect achieve the purpose of improving the water resistance of polyvinyl alcohol, certain drawbacks became evident. One of the objections to the use of many previously proposed modifiers of polyvinyl alcohol arises because of possible deleterious, and particularly toxic, characteristics imparted to the material so that it was undesirable to bring the material into contact with the human body, whether skin or mucous membrane, or to employ the material as a wrapper or container for food products.

It is an important objective to provide a polyvinyl alcohol complex film which can be brought into contact with food stuffs such as in food and candy wraps, frozen food containers, paper bags and the like, and also with the skin of humans, in the form of facial tissues, toilet tissues, disposable towels, paper gowns and the like.

It is accordingly important that any modifying chemicals used should be non-toxic and should not render toxic the polyvinyl alcohol which in itself is non-toxic.

With the use of prior modifiers for polyvinyl alcohol film, also, a cross linking effect was obtained which resulted in a denser, less elastic and more brittle end product, even though accompanied by the desired object of reduced water sensitivity. Such embrittlement, which occurs when materials such as boric acid or sodium borate are employed, can be of such a degree as to destroy the usefulness of the product, particularly if applied to oriented polyvinyl alcohol film.

In connection with the invention I have found that highly desirable results are obtained by the employment of metallic lactates and particularly certain specific lactates which are non-toxic while at the same time providing a greatly increased degree of orientation, and with commercially acceptable timing characteristics.

In my prior U.S. Patent No. 2,546,705, and in my copending application, Serial No. 403,459 (Patent No. 2,867,560) there were disclosed processes for the production of stretched polyvinyl alcohol film. These prior processes had limitations in so far as use in production is concerned, because of more limited stretching available therewith and the high dwell times required. The products were limited as to their use because the film materials, while extremely thin, were not of sufficient tensile strength for machine handling and the production of a tough laminate for use in continuous production operations.

It is the principal object of the present invention to provide an improved polyvinyl alcohol complex film, which is particularly suited for high speed production operations.

It is a further object of the present invention to provide a polyvinyl alcohol complex film suitable as a liminate which is of high tensile strength and toughness and is relatively inexpensive because of the extremely thin character and light weight.

It is a further object of the present invention to provide a polyvinyl alcohol complex film which is thinner than has heretofore been possible of attainment.

It is a further object of the present invention to provide a polyvinyl alcohol complex film which is non-toxic and accordingly suitable for contact with the human body or with food for human consumption.

It is a further object of the present invention to provide a polyvinyl alcohol complex film which can be made as a complete integral film capable of folding, creasing and handling in packaging machinery without rupture or breakage and which will retain its integrity during subsequent operations, including lamination with other materials, if desired.

It is a further object of the present invention to provide improved methods for the production of a polyvinyl alcohol complex film of the character aforesaid.

It is a further object of the present invention to provide improved methods of making a polyvinyl alcohol complex film which can be carried out as continuous and controlled processes.

Other objects and advantageous features of the invention will be apparent from the description and claims.

The nature and characteristic features of the invention will be more readily understood from the following description, although it will of course be understood that various modifications and changes can be made in the articles, and methods, disclosed, including proportions and temperature ranges, without departing from the spirit of the invention.

In accordance with the present invention polyvinyl alcohol film, preferably in pre-cast or molded form, previously plasticized, and of the type which is relatively insoluble in cold water or water at ordinary room temperatures, is employed. For this purpose, the polyvinyl alcohol film is preferably of the order of one mil (0.001 inch) in cross section thickness, although a thicker or thinner film could be employed.

In order to condition the pre-cast film, and provide the desired finished film for lamination and other purposes, the film or sheet is subjected to a stretching action of predetermined extent, and preferably in a plurality of directions. While the stretching may be effected in three or more directions simultaneously, or in a selected sequence, it is preferred for simplicity and to facilitate continuous production operation to stretch the film in two directions in sequence at right angles to each other, so that the resultant is an increase in dimensions longitudinally and laterally, although not necessarily with the same increase in both dimensions.

The stretching operation is preferably carried out in a suitable environment and in accordance with methods to be explained and can be followed by other operations, including stabilization, lamination and the like.

*Method A*

Previously cast polyvinyl alcohol film of a thickness of the order of 1 mil is immersed in a stretching solution.

A preferred stretching solution is as follows:

| | Parts by weight |
|---|---|
| Sodium lactate | 2.55 |
| Glycerine | 6.00 |
| Water, sufficient to make a total of 1000 parts by weight. | |

Another preferred stretching solution is as follows:

| | Parts by weight |
|---|---|
| Calcium lactate | 2.50 |
| Glycerine | 6.00 |
| Water, sufficient to make a total of 1000 parts by weight. | |

Another preferred stretching solution is as follows:

| | Parts by weight |
|---|---|
| Calcium lactate | 1.25 |
| Sodium lactate | 1.25 |
| Glycerine | 6.00 |
| Water, sufficient to make a total of 1000 parts by weight. | |

The quantity of sodium lactate or calcium lactate may be varied in the range from one and one-quarter parts per thousand to four and one-half parts per thousand, the optimum being 2.25 to 2.55 parts per thousand.

Other metallic lactates, such as ferrous, aluminum, ammonium, magnesium, lithium, barium, strontium, cupric, manganese, zinc and silver lactates can be employed but sodium lactate and calcium lactate are preferred as they are nontoxic and do not introduce toxic end results.

The cast polyvinyl alcohol film is immersed in the stretching solution just referred to for a period of time of approximately one second and then, while in the stretching solution, is longitudinally stretched within a period of the order of three seconds up to five times its initial longitudinal dimension. The temperature of the stretching solution during the immersion of the film is preferably maintained in the range between about 95° F. and 105° F., the preferred temperature being 100° F.

The thus stretched polyvinyl alcohol film is advanced and removed from the stretching solution, and then is immediately stretched to about six times its initial longitudinal dimension in air at a temperature in the range from about 70° F. to 80° F. and in a time interval of the order of ½ second to 1 second. The multistretched film is then relaxed to about five times its original longitudinal dimension and while in air at the temperature just mentioned is immediately given a lateral stretch of twice its original lateral dimension and in a time interval of the order of ¼ second to 1 second.

The film thus produced will have a surface area about ten times that of the original surface of the film, a weight of the order of about three grams per square yard, and results in an extremely thin, pinhole free, metallic lactate-polyvinyl alcohol-glycerine complex film, highly oriented in a plurality of directions, which is free from pinholes and light diffraction patterns, and is of high tensile strength, in relation to cross section area. This film can then either be air dried and heat stabilized with a stabilization of the character described in my prior application, Serial No. 403,459, to form a marketable and useful product in itself, or it may be laminated in any one of various ways to various types of sheet material. The laminating operation can include air drying for about one quarter of second to one second with an air blast at 100° F. to 125° F. and further can be heat stabilized, for example, at a temperature of 375° F. for one-half second.

Method B

Previously cast polyvinyl alcohol film, of a thickness of the order of 1 mil, is immersed in a stretching solution, as previously described for Method A.

The cast polyvinyl alcohol film is immersed in the stretching solution of Method A, at the temperature range previously stated for a period of time of approximately one second, and then while maintained in the stretching solution, is longitudinally stretched within a period of the order of three seconds up to about six times its initial longitudinal dimension. The thus stretched polyvinyl alcohol film is advanced and removed from the stretching solution, and then is immediately stretched in a time interval of the order of one-half second to one second up to about seven or eight times its initial longitudinal dimension while subjected to air at a temperature in the range from 70° F. to 80° F.

The multistretched film is then relaxed to about six or seven times its original longitudinal dimension and immediately and in a time interval of the order of one-half second to one second given a lateral stretch of twice its original lateral dimension, the stretch being continued to three times with mild air drying, preferably provided by blasts of air at a temperature between 100° F. and 125° F.

A spray coat or doctor coat of stretching solution is immediately applied on one side of the film at the same temperature as that of the original stretching solution with a dwell time of the order of one-quarter of a second to one-half second, and the lateral stretching is continued, with the film thus moistened, to four and one-half or more times the original lateral dimension in a time period of the order of one-half second to one second.

The film thus produced will have a surface area about 30 times that of the original surface area of the cast film, and results in an extremely thin metallic lactate-polyvinyl alcohol film of high tensile strength with light diffraction lines giving a colorful effect and, while not entirely pinhole free, still has a wide range of usefulness.

While the exact action which occurs is not fully understood, it is believed that the addition of the relatively small quantities of calcium or sodium lactate or other metallic lactates produces a metallic lactate-polyvinyl alcohol-glycerine complex which has characteristics not heretofore attained or capable of attainment. The resultant film is highly oriented in one or more directions and has an unexpectedly high tensile strength, and freedom from failure upon creasing or bending. The resultant film in multistretched form is transparent.

Films made by either of the methods heretofore described may be employed for lamination to one side of a single sheet of any type of paper including kraft, tissue, facial tissue, newsprint, and the like, in order to render the laminated paper grease proof and increase its strength, wet or dry.

The films formed by either of the methods heretofore described may be laminated to both outer side faces of a single layer of paper such as kraft, tissue, facial tissue, newsprint and the like, in order to provide a laminate which is grease proof and of increased strength, wet or dry. The transparent character of the film makes it particularly suited to protect documents and render the same tamperproof, and to impart a permanent protective coating or laminant.

Films formed as heretofore described may be employed for lamination between two single sheets or webs of paper such as kraft, tissue, facial tissue, newsprint and the like in order to make a three-ply laminate with the oriented metallic lactate-polyvinyl alcohol-glycerine complex film forming the inner web and thus rendering the three-ply laminate grease proof and of increased strength, wet or dry.

Films formed as heretofore described may be employed for lamination to one or more sides of any cellulosic product in order to render the same grease proof and increase its strength, wet or dry.

Films formed as heretofore described may be employed for lamination to one or more sides of noncellulosic sheet material such as aluminum foil, polyethylene film, polyvinyl chloride films, acetate films, rubber chloride films and the like, with suitable adhesives, thereby providing a laminated material which is grease proof, impervious to certain gases, resistant to deteriorating effects of sunlight, and particularly if calcium lactate and/or sodium lactate are employed, with at least one surface non-toxic to food substances for certain types of food wraps.

Laminated materials as heretofore described have a wide range of uses including grease and waterproof wraps, bags and the like with added wet and dry strength, and resistance to breakage at crease lines encountered with normal wet strength additives to paper.

With the film produced by Method B, fancy tissue wraps may be made by lamination of the film with tissue paper which presents an attractive appearance because of the light diffraction qualities, while at the same time having a high strength and resistance to tearing and bursting.

The films produced as described above and without lamination may be surface treated on one or both faces with any one or combination of well known waterproofing and insolubilizing agents to make a useful and marketable product which does not require lamination.

The films produced as described above are not brittle even at low humidities and low temperatures and are accordingly suitable for use in freezing temperatures.

The metallic lactate-polyvinyl alcohol-glycerine complex film can also have an additional adhesive applied to either or both faces for added bonding effect. One suitable bonding solution for this purpose consists, in parts by weight, of:

| | Percent |
|---|---|
| Polyvinyl alcohol | 0.5 |
| Lactic acid | 0.25 |
| Wetting agent, such as sodium lauryl sulfate | .03 | with water to make up the remaining 100%.

If this bonding solution is employed, it is preferred to stabilize the bond after application to the film by heat stabilization and subjecting the same to a temperature of the order of about 375° F. for a time interval of about one-half second.

The metallic lactate polyvinyl alcohol complex film can also be treated to improve the hand, particularly if a tissue type of product is desired, and for this purpose a treating solution can be employed containing:

| | Grams |
|---|---|
| Cetyl alcohol | 0.25 |
| Glycerine | 10.00 |
| Sodium lauryl sulphate | 0.25 |

Water added sufficient to make 250 cc.

The cetyl alcohol is first melted and then dispersed in the sodium lauryl sulfate-glycerine combination. Water at a temperature of 100° F.—150° F. is then slowly added to make 250 cc.

I claim:

1. Sheet material comprising polyvinyl alcohol film which has been oriented by extension to a plurality of times an original dimension of the material in an aqueous stretching solution containing small quantities of a metallic lactate and glycerine.

2. Film material as defined in claim 1 which has been oriented by extension to a plurality of times the original dimension of the material in a plurality of directions.

3. Film material as defined in claim 1 which has been oriented in a plurality of directions up to a total of thirty times the original surface area.

4. Film material as defined in claim 1 which has been oriented in a plurality of directions up to a total of thirty times the surface area and which has been partially stabilized by air drying under tension at 70° F. to 125° F.

5. Film material as defined in claim 1 which has been oriented in a plurality of directions up to a total of thirty times the original surface area and which has been substantially stabilized by heat application to the sheet material under tension at a temperature of the order of 375° F. to 475° F. for a time period from one-fourth second to one-half second.

6. Sheet material as defined in claim 1 having at least one face thereof insolubilized.

7. Laminated sheet material comprising an integral web of polyvinyl alcohol film which has been stretched a plurality of times its original dimensions in at least one direction in an aqueous solution containing small quantities of a metallic lactate and glycerine and in which the integrity of the web is retained having in direct adherent engagement with at least one face theerof a paper lamination, said material being capable of folding creasing and handling without rupture of the film and loss of its barrier characteristics.

8. Laminated sheet material comprising an integral web of polyvinyl alcohol film which has been stretched a plurality of times its original dimensions in more than one direction in an aqueous solution containing small quantities of a metallic lactate and glycerine and in which the integrity of the web is retained having in direct adherent engagement with at least one face thereof an additional lamination of thin sheet material, said laminated material being capable of folding, creasing and handling without rupture of the film and loss of its barrier characteristics, said film weighing not more than three grams per square yard.

9. Laminated sheet material comprising an integral web of polyvinyl alcohol film which has been stretched a plurality of times its original dimensions in more than one direction in an aqueous solution containing small quantities of a metallic lactate and glycerine and in which the integrity of the web is retained having in direct adherent engagement with at least one face thereof a thin paper lamination, said laminated material being capable of folding, creasing and handling without rupture of the film and loss of its grease barrier characteristics and having enhanced wet and dry strength, said film weighing not more than three grams per square yard.

10. The method of treating polyvinyl alcohol film which consists in immersing the film in an aqueous stretching solution containing small quantities of a metallic lactate and glycerine, longitudinally stretching the film to at least five times its initial longitudinal dimension while so immersed, removing the film from the stretching solution and stretching the same to at least six times its lateral dimension in air at a temperature in the range from 70° F. to 80° F.

11. The method of treating polyvinyl alcohol film which consists in immersing the film in an aqueous stretching solution containing sodium lactate and glycerine, longitudinally stretching the film to at least five times its initial longitudinal dimension while so immersed, removing the film from the stretching solution and stretching the same to at least six times its length in air at a temperature in the range from 70° F. to 80° F., relaxing the film longitudinally, and immediately laterally stretching the film at least two times its original lateral dimension.

12. The method of treating polyvinyl alcohol film which consists in immersing the film in a stretching solution containing, in parts by weight, metallic lactate, 1¼ to 4½ parts per thousand, glycerine, 6 parts per thousand, and water to make up the remainder, at a temperature in the range from 95° F. to 105° F.; longitudinally stretching the film to five times its initial longitudinal dimension while so immersed; removing the film from the stretching solution and stretching the same to at least six times its length in air at a temperature in the range from 70° F. to 80° F.; relaxing the film to about five times its original longitudinal dimension, and immediately laterally stretching the film at least two times its original lateral dimension in air at the same temperature range.

13. The method of treating polyvinyl alcohol film which consists in immersing cast polyvinyl alcohol film in an aqueous stretching solution containing a metallic lactate and glycerine, longitudinally stretching the film to at least five to six times its initial longitudinal dimension while so immersed, removing the film from the stretching solution and stretching the film to seven to eight times its initial longitudinal dimension in air at a temperature in the range from 70° F. to 80° F., relaxing the film longitudinally, laterally stretching the film to the order of two times its initial lateral dimension and continuing to stretch the film laterally to about three times its initial lateral dimension with mild air drying at a temperature in the range from 100° F. to 125° F.

14. The method of treating polyvinyl alcohol film which consists in immersing cast polyvinyl film in an aqueous stretching solution containing a metallic lactate selected from the group consisting of calcium lactate and sodium lactate, and glycerine at a temperature in the range from 95° F. to 105° F., longitudinally stretching the film to five to six times its initial longitudinal dimension while so immersed, removing the film from the stretching solution and stretching the film to seven to eight times its initial longitudinal dimension in air at a temperature in the range from 70° F. to 80° F., relaxing the film longitudinally, laterally stretching the film to the order of two times its initial lateral dimension and continuing to stretch the film laterally to about three times its initial lateral dimension with mild air drying at a temperature in the range from 100° F. to 125° F., applying a coating of the stretching solution on one side of the film at a temperature in the range from 95° F. to 105° F. and continuing the lateral stretch to at least four and one-half times the initial lateral dimension.

15. The method of treating polyvinyl alcohol film which consists in immersing cast polyvinyl alcohol film in a stretching solution containing, in parts by weight, a metallic lactate from the group consisting of calcium lactate and sodium lactate, one and one-half to four and one-half parts per thousand, glycerine, six parts per thousand, and water to make up the remainder, at a temperature in the range from 95° F. to 105° F.; longitudinally stretching the film to five to six times its initial longitudinal dimension while so immersed; removing the film from the stretching solution and stretching the same to seven to eight times its initial longitudinal dimension in air at a temperature in the range from 70° F. to 80° F.; relaxing the film to about six to seven times its original longitudinal dimension; laterally stretching the film to the order of two times its initial lateral dimension and continuing to stretch the film laterally to about three times its initial lateral dimension with mild air drying at a temperature in the range from 100° F. to 125° F.; applying a coating of the stretching solution on one side of the film at a temperature in the range from 95° F. to 105° F.; and continuing the lateral stretch to at least four and one-half times the initial lateral dimension.

16. The method of treating polyvinyl alcohol film which consists in immersing the film in an aqueous stretching solution containing small quantities of a metallic lactate and glycerine, stretching the film along one of its initial dimensions to a plurality of times that dimension while so immersed, removing the film from the stretching solution and stretching the same in a direction corresponding to the other initial dimension a plurality of times that dimension in air at a temperature in the range from 70° F. to 80° F.

References Cited in the file of this patent
UNITED STATES PATENTS

| | | |
|---|---|---|
| 2,146,295 | Herrmann et al. | Feb. 7, 1939 |
| 2,249,514 | Berg et al. | July 15, 1941 |
| 2,443,368 | Ranald et al. | June 15, 1948 |
| 2,546,705 | Strawinski | Mar. 27, 1951 |
| 2,867,560 | Strawinski | Jan. 6, 1959 |